June 5, 1956 J. H. BOOTH 2,748,570
COMBUSTION ENGINE DRIVEN HYDRODYNAMIC BRAKE FLUID HEATER
Filed July 13, 1951 3 Sheets-Sheet 1

Inventor
James H. Booth
by Hill, Sherman, Meroni, Gross & Simpson Attys

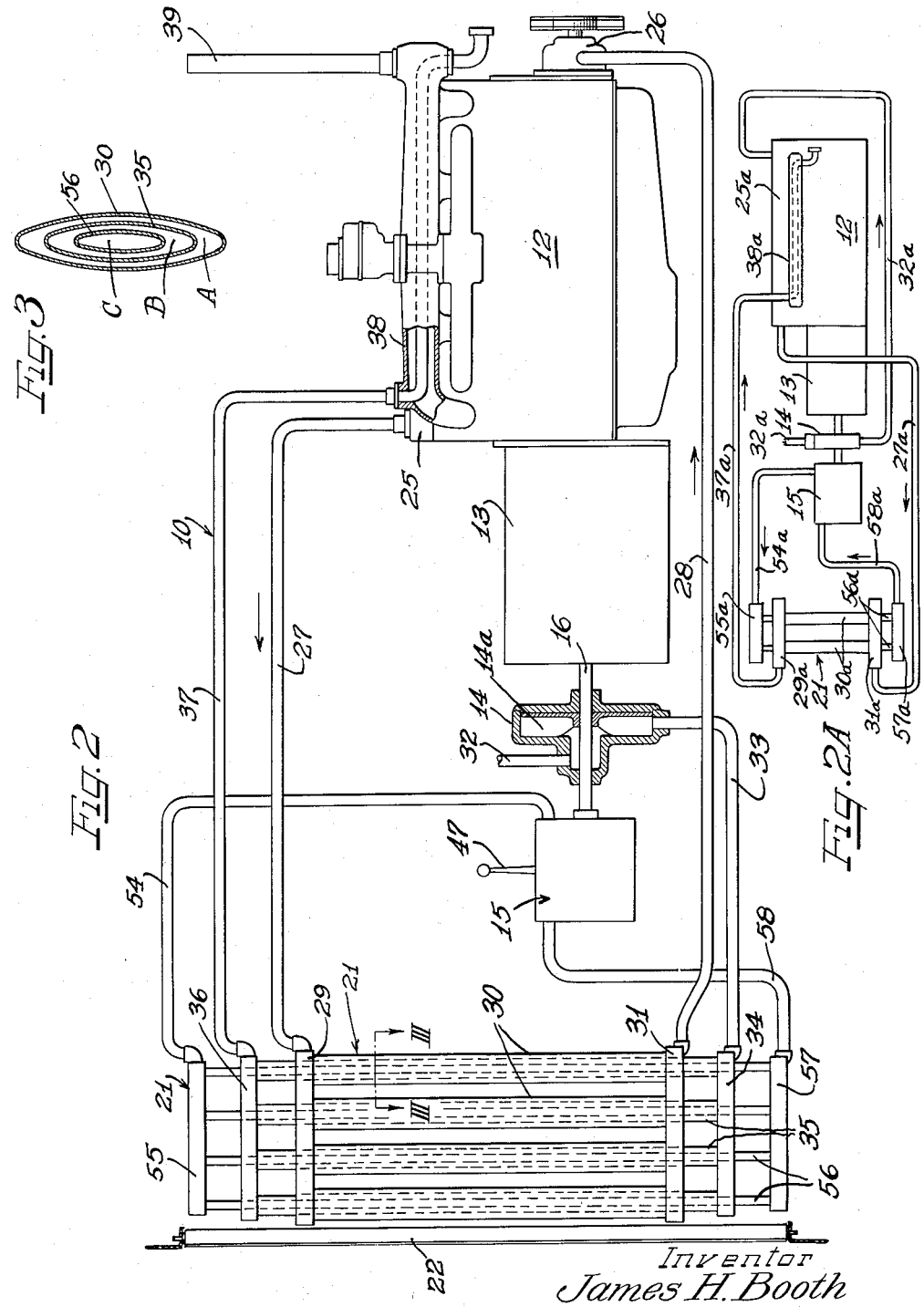

June 5, 1956   J. H. BOOTH   2,748,570
COMBUSTION ENGINE DRIVEN HYDRODYNAMIC BRAKE FLUID HEATER
Filed July 13, 1951   3 Sheets-Sheet 3
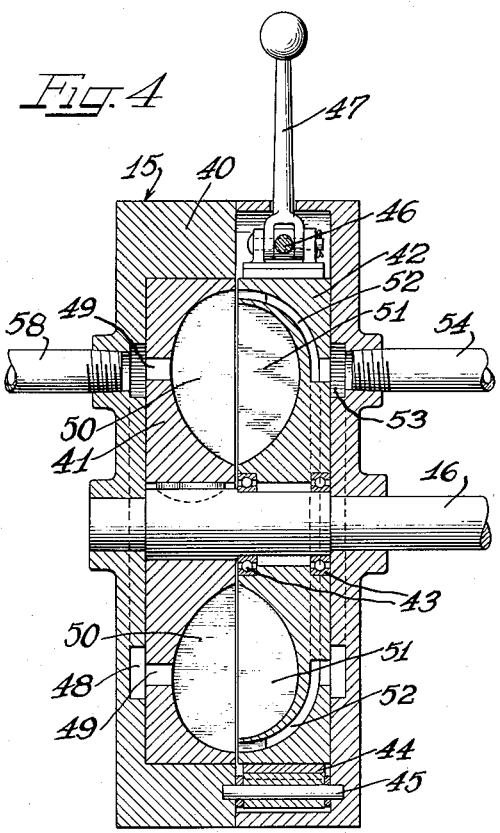
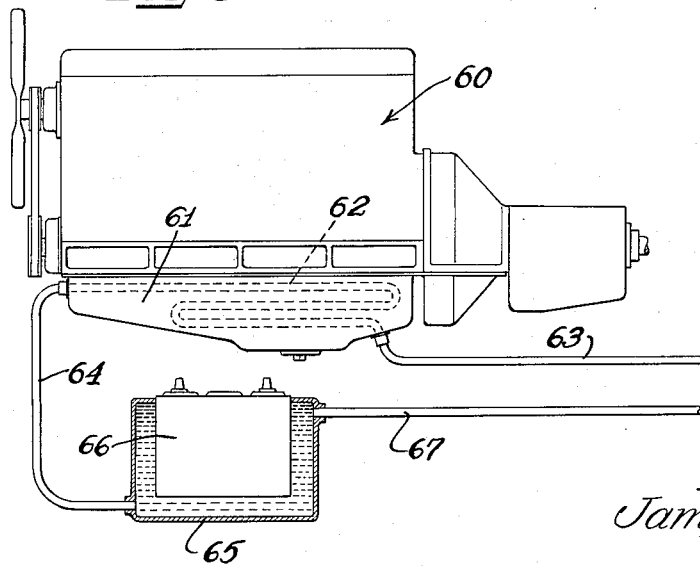
Inventor
James H. Booth
by Hill, Sherman, Meroni, Gross & Simpson
Attys

United States Patent Office 2,748,570
Patented June 5, 1956

2,748,570

COMBUSTION ENGINE DRIVEN HYDRODYNAMIC BRAKE FLUID HEATER

James H. Booth, Venice Township, Shiawassee County, Mich., assignor to Thompson Products, Inc., Cleveland, Ohio, a corporation of Ohio Application July 13, 1951, Serial No. 236,613

12 Claims. (Cl. 60—97)

This invention relates to a fluid heater energized by a dynamic fluid friction brake system.

Specifically, the invention deals with a heat engine energized heater deriving heat from the engine cooling system, the engine exhaust system, and an engine driven hydrodynamic brake. The invention also includes a heating circuit for the crankcase and battery case of an internal combustion engine.

In accordance with this invention, an internal combustion engine is arranged to heat a liquid, such as water, from heat liberated by the engine body, the engine exhaust gases, and a brake fluid which is heated by fluid friction generated in a hydrodynamic brake driven by the engine.

The preferred embodiment of the invention includes a stationary motor driven electric generator set and mechanism for selectively operating the hydrodynamic brake so that brake driving power will only be used when the engine is operating to heat the liquid. In this preferred embodiment, a first engine driven pump circulates engine coolant through a radiator and a water jacket of the engine. The engine drives the hydrodynamic brake which circulates a fluid through a closed cycle including the radiator. The engine also drives a second pump which circulates the liquid to be heated through the engine radiator in heat exchange relation with both the brake fluid and the coolant. After the liquid is heated in the radiator, it passes through the exhaust manifold of the engine to be further heated by the exhaust gases. The liquid is therefore circulated so as to extract heat from the coolant, the brake fluid, and the exhaust gases.

Alternately the liquid to be heated can be pumped directly through the engine water jacket either before or after absorbing heat from the brake fluid.

The thus heated liquid is useful for many purposes, such as thawing out frozen engines by circulation through the crankcases and coolant jacketed battery cases thereof. The stationary engine assembly is especially useful to generate hot water for army camps and the like, and, of course, the engine can be the prime mover of a vehicle, thereby making hot water available to mobile troops.

It is, then, an object of this invention to provide a fluid heater energized by fluid friction.

Another object of the invention is to provide a fluid heater actuated by an internal combustion engine and energized by dynamic fluid friction, engine coolant, and engine exhaust gas.

A still further object of the invention is to provide a high capacity portable water heater wherein the main source of heat is developed by a hydrodynamic brake driven by the engine.

A specific object of the invention is to provide a motor generator set with a hydrodynamic brake for generating heat from horsepower delivered by the motor.

A further object of the invention is to provide a portable motor and hydrodynamic brake assembly with a fluid system that will rapidly heat water and deliver hot water to a convenient outlet.

Other and further objects of the invention will be apparent to those skilled in the art from the following detailed description of the annexed sheets of drawings which, by way of a preferred example only, illustrate one embodiment of the invention.

On the drawings:

Figure 2 is a diagrammatic view of the assembly of Figure 1.

Figure 2A is a diagrammatic view of an alternative assembly.

Figure 3 is a transverse cross-sectional view taken along the line III—III of Figure 2.

Figure 4 is an enlarged vertical cross-sectional view, with parts in elevation, of a suitable hydrodynamic brake for the assembly of Figures 1 and 2.

Figure 5 is a somewhat diagrammatic elevational view illustrating the manner in which an engine can be heated by fluid from the assemblies of Figures 1, 2, and 2A.

As shown on the drawings:

Figure 1:
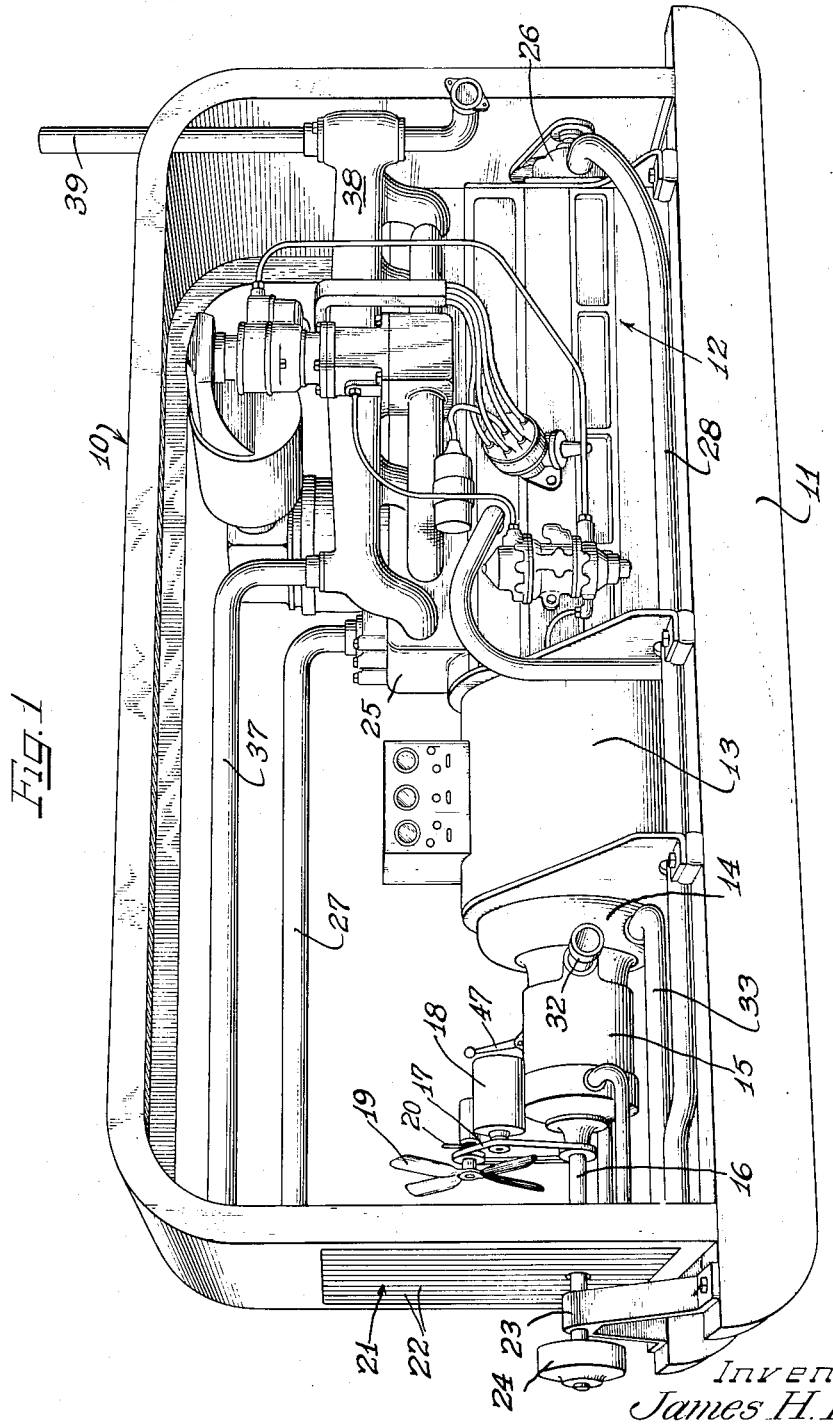
Figure 1 is a perspective view of a portable internal combustion engine and generator set equipped with a selectively operated hydrodynamic brake and a fluid system for pumping and heating water.

As shown in Figures 1 and 2, the heater assembly 10 includes a portable skid type frame 11 supporting an internal combustion engine 12, and a generator 13. The motor 12 drives the generator 13, a large capacity water pump 14, a hydrodynamic or fluid friction brake 15, and a through shaft 16. The shaft 16 drives a belt 17 which, in turn, drives a generator 18 for the electric system of the engine 12 and selectively drives a cooling fan 19 through a clutch 20 so that the fan can be idled without stopping the generator 18. A radiator 21 is mounted on the frame 11 in front of the fan 19 and has a plurality of swingable vertical shutters 22 adapted to be positioned for permitting free circulation of air through the radiator or for stopping circulation. The drive shaft 16 extends through the radiator 21 and a bearing support 23 is provided on the front end of the frame 11 for journaling the shaft. A power take-off pulley 24 is mounted on the front end of the shaft.

The engine 12 includes the conventional water jacketed body 25, engine driven pump 26 for circulating water or other coolant through the body 25, conduit 27 for conveying the fluid from the body 25 to the radiator 21 and conduit 28 for returning the coolant from the radiator back to the pump 26 and water jacketed engine body 25.

As best shown in Figure 2, the conduit 27 for the hot coolant from the body 25 discharges into a header 29 in the radiator assembly 21 which feeds the hot coolant downwardly through outer radiator tubes 30 and thence into a bottom header 31 discharging into the return conduit 28.

When the engine 12 is being operated with the hydrodynamic brake in an "off" position, the shutters 22 will be opened, the fan 19 will be driven through the clutch 20, and water or other coolant will be circulated through the tubes 30 of the radiator while air passes around these tubes to cool the water and maintain the engine at the desired operating temperature.

However, when the hydrodynamic brake 15 is "on," the shutters 22 will be closed, the fan 19 will be stopped by disengaging the clutch 20, and the pump 14 will be driven by the through shaft 16 from the engine 12 to propel water or other fluid to be heated from inlet conduit 32 to an outlet conduit 33 which discharges into a header 34 in the radiator assembly. The header 34, in turn, discharges upwardly through a plurality of tubes 35 inside of the tubes 30 in spaced concentric relation therewith. The tubes 35, in turn, discharge into a top header 36 which empties into a conduit 37 extending through the exhaust gas manifold 38 of the engine 12. The manifold 38 discharges to a vertical exhaust pipe 39 extending above the frame cover, while the conduit 37 terminates in a coupling beyond the exhaust manifold 38. The pump 14, as best shown in Figure 2, can have any type of impelling mechanism such as, for example, a centrifugal impeller 14a.

The hydrodynamic or fluid friction brake 15, as best shown in Figure 4, includes a housing 40 having a pair of opposed vaned rotors 41 and 42 therein. The rotor 41 is keyed or plined to the shaft 16 for co-rotation therewith. The rotor 42 is free on the shaft 16 and is mounted on antifriction bearings 43. A brake band 44 surrounds the rotor 42 and is anchored to the housing 40 on a conventional anchor pin 45 or the like. The band is expanded or contracted by means of a draw rod 46 operated by a cam mechanism from a handle 47 which projects through a slot in the casing or housing 40. When the brake band 44 is tightened, the rotor 42 will be stationary. When the brake band 44 is loosened, the rotor 42 is free to rotate with the rotor 41.

The hydrodynamic brake 15 is preferably of the closed cycle self-circulating type and includes a fluid inlet port 48 communicating through ports 49 in the rotor 41 with chambers between vanes 50 that radiate around the hub of the rotor and are shaped so as to circulate the fluid into compartments between vanes 51 in the rotor 42. However, the outer ends of the vanes 50 are arranged to discharge into ports 52 in the rotor 42 which discharge into an annular port 53 in the housing 40. The hydrodynamic brake arrangement is such that when the brake rotor 42 is free to rotate on the bearings 43 the hydraulic fluid in the vane compartments will drive the rotor 42 with the rotor 41 without exerting fluid friction on the fluid in the rotor compartment. However, when the brake 44 is tightened to hold the rotor 42 against rotation, fluid in the vane compartments will be subjected to shearing action and will become appreciably heated. Since the brake assembly has an inherent pumping action, this fluid is circulated from the outer periphery of the rotors to the port 53 which discharges through a conduit 54 into a top header 55 of the radiator assembly. This header 55, as best shown in Figure 2, discharges downwardly through tubes 56 which extend through the tubes 35 in spaced concentric relation therein. The lower ends of the tubes 56 discharge into a bottom header 57 which is connected by a conduit 58 back with the inlet port 48 of the brake assembly. Therefore, the brake fluid flows in a closed circuit including the hydrodynamic brake and the innermost tubes 56 of the radiator assembly. When the brake 44 is tightened, so as to place the fluid friction brake in operation, this brake fluid in the closed circuit will become heated by fluid friction and will radiate its heat through the tubes 56 to the water in the surrounding tubes 35. Likewise, the heated coolant in the outer tubes 30 will radiate its heat through the middle tubes 35 to add heat capacity.

As illustrated in Figure 3, an outer tube path A is provided between the tubes 30 and 35. This path receives the engine coolant. An intermediate path B is provided between the tubes 56 and 35. This path receives the water or other liquid to be heated. An inner path C is provided through the tubes 56. This path receives the brake operating fluid. Since the paths A and C receive heated fluid at the top ends thereof while the intermediate path B receives the fluid to be heated at the bottom end thereof, an efficient counter-current heat transfer from A and C to B is effected. As a result, heated liquid is discharged into the conduit 37 and is further heated by the exhaust gases in the manifold 38 since the conduit 37 passes through the manifold.

In the alternate arrangement shown in Figure 2A, the engine 12 receives the liquid to be heated from the pump 14 through pipe 33a which discharges into the engine water jacket 25a. The liquid then flows through pipe 27a to the bottom of the radiator 21 for circulation upwardly through header 31a, outer tubes 30a and top header 29a into pipe 37a and through manifold 38a. The brake fluid is circulated through pipe 54a into top header 55a, down through tubes 56a inside the tubes 30a and into header 57a from which it flows back to the brake 15 through pipe 58a. The pump 14 is effective to circulate the liquid to be heated through the engine, the radiator, and the manifold. The liquid absorbs engine heat, brake fluid heat, and exhaust gas heat before reaching the outlet coupling. Since, in this arrangement, no separate engine coolant is used, it is not necessary to use more than two sets of nested radiator tubes, nor is the separate coolant pump necessary. If desired, the liquid from pump 14 can be first heated by the brake fluid and then by the engine.

The heated liquid from the conduit 37 or 37a can be used for many different purposes and is especially useful in thawing out frozen engines or in keeping these engines at temperatures so that they can be easily started. Thus, as shown in Figure 5, an internal combustion engine 60 has a crankcase 61 equipped with a heating coil 62 receiving heated liquid from a hose or other conduit 63 that is coupled to the pipe 37 or 37a. The heated liquid, after passing through the heating coil 62, is circulated through a conduit 64 into a jacket 65 containing a battery 66 for the engine 60. This battery 66 is quickly heated by the heated liquid in the jacket 65 and the liquid is then returned through a conduit 67 back to the pump inlet 32 or 32a, where it can be reheated and recirculated back to the engine 60. In this manner, it is possible to use one unit, such as 10, for heating a plurality of engines, such as 60, to keep these engines close to their operating temperatures so that they can be easily started even when exposed to arctic temperatures.

When the generator 13 in the assembly 10 is not being used, the armature therein will serve as a flywheel for the through shaft 16 to give a smooth driving of the pump 14 and the hydrodynamic brake 15. When the generator 13 is being used, however, it is still permissible to use the brake 15 as a heat generating member. However, when the heating capacity of the assembly is not needed, the brake 15 can be moved to its idle or "off" position by loosening the band 44, whereupon the through shaft 16 will utilize the rotor 41 as a flywheel and no appreciable load will be added, since the rotor 42 is idle and free to rotate with the rotor 41. No appreciable heating or frictional shearing of the liquid in the brake will then occur.

From the above descriptions, it will therefore be understood that this invention provides a convenient fluid heater utilizing both engine torque and heat of combustion liberated by the torque producing engine as the heating media.

It will be understood that modifications and variations may be effected without departing from the scope of the novel concepts of the present invention.

I claim as my invention:

1. In combination with a heat engine having an exhaust manifold and a cooling system including a coolant jacket on the engine body, a radiator and an engine driven pump for circulating coolant through the jacket and radiator, a second pump driven by the engine, means in said radiator in heat exchange relation with coolant from the engine jacket and receiving fluid from said second pump, a hydrodynamic brake having a first vaned rotor driven by said engine and an opposed vaned rotor driven by the first rotor, means defining a closed fluid circuit through said brake in heat exchange relation with coolant in the radiator and fluid from the second pump, means for selectively holding the second rotor against rotation to cause the brake to heat fluid in said closed circuit, and a conduit in heat exchange relation with the exhaust manifold receiving fluid from the second pump after the fluid has been heated by coolant and brake fluid in the radiator.

2. In combination with a heat engine and a coolant circuit including a radiator, a hydrodynamic brake driven by said engine having a brake fluid circuit in heat exchange relation in said radiator, and a circulating pump driven by said engine and connected in a fluid system to which heat is to be added, to propel liquid through said radiator in heat exchange relation with both said coolant circuit and said brake fluid in said radiator.

3. A turbulent fluid heater which comprises a heat engine, a fluid friction brake selectively driven by said engine, a closed brake fluid circuit for said fluid friction brake, said circuit comprising a conduit circulating fluid from the braking elements of said brake to a heat exchanger, and means for circulating a second fluid to be heated in physically isolated heat exchange relation with heated brake fluid in said heat exchanger and heat liberated from said heat engine.

4. In combinaation with an internal combustion engine having a coolant jacketed body, an exhaust gas manifold, and a radiator, a fluid friction brake having a closed brake fluid circulating system including said radiator, and a pump driven by said engine for circulating fluid to be heated into heat exchange relation with brake fluid in said radiator and with heat liberated by said engine in said coolant jacket and in said exhaust manifold for subjecting the fluid to be heated to the combined heating action of brake fluid, radiated engine heat, and exhaust gases discharged from the engine.

5. A heater assembly comprising an internal combustion engine, a hydrodynamic brake driven by said engine, a closed brake fluid circuit for said brake, a pump driven by said engine for circulating fluid to be heated into heat exchange relation with the engine and with the brake fluid, a second internal combustion engine having a crankcase and a jacketed battery, and means for circulating heated fluid from said first mentioned engine through the crankcase of said second engine and through the jacketed battery for maintaining said second engine at an operating temperature.

6. A portable turbulent heater which comprises a portable frame, an internal combustion engine mounted on said frame, a fluid friction brake driven by said engine, a radiator mounted on said frame, a brake fluid circuit in heat exchange relation with said radiator, an engine coolant circuit in heat exchange relation with said radiator, a pump driven by said engine, and a circuit for fluid discharged from said pump including portions in heat exchange relation with brake fluid and coolant fluid in said radiator.

7. A turbulent fluid heater which comprises an internal combustion engine having a water jacket, an exhaust manifold, a radiator, and a first pump for circulating coolant through the radiator and water jacket, a fluid friction brake driven by said engine having a closed brake fluid circuit in heat exchange relation with coolant in said radiator, and a second pump driven by said engine for circulating fluid to be heated through said radiator in heat exchange relation with coolant and with brake fluid and for discharging the fluid through the exhaust manifold in heat exchange relation with hot gases therein.

8. A portable heater comprising a frame, a heat engine mounted on said frame, a radiator mounted on said frame, a shaft driven by said engine, an electric generator driven by said shaft, a pump driven by said shaft, a hydrodynamic brake having a first rotor driven by said shaft and an opposed second rotor mounted for free rotation, said first and second rotors having radiating vanes, means providing a closed brake fluid circuit through said radiator and said pump for circulation of brake fluid, means for locking said second rotor against rotation to cause the brake fluid to be heated by fluid friction, a coolant system for said engine including a circuit through said radiator, and a pump driven by said engine for propelling liquid through the radiator in heat exchange relation with the brake fluid and the engine coolant for absorbing heat therefrom.

9. A heater for liquids which comprises an internal combustion engine, a jacketed body on said engine, an exhaust gas manifold on said engine, a pump driven by said engine, a hydrodynamic brake driven by said engine, a radiator associated with said engine, means defining a first path through said radiator in closed circuit relation with said hydrodynamic brake for circulating brake fluid therethrough, a pipe connecting the discharge side of said pump with the jacket of said engine, a second pipe connecting the jacket of said engine with said radiator, means providing a second closed circuit in said radiator in heat exchange relation with the brake fluid circuit, a third pipe in heat exchange relation with said manifold receiving liquid from said second circuit, and means in said hydrodynamic brake for circulating brake fluid through said first circuit in said radiator, whereby liquid propelled by said pump will absorb heat liberated by said engine, said brake fluid, and gases in said exhaust manifold.

10. A water heater comprising an internal combustion engine, a hydrodynamic brake driven by said engine, said brake having a closed brake fluid circuit, a pump driven by said engine, and conduits associated with said pump and engine for circulating liquid discharged from the pump into heat exchange relation with the engine and the brake fluid at a point removed from said brake.

11. In combination with a water jacketed internal combustion engine, a pump driven by said engine for circulating water through the water jacket thereof, a fluid friction brake driven by said engine, said brake having a closed brake fluid circuit, and means for circulating water from said pump in heat exchange relation with the brake fluid circuit at a point remote from said brake for absorbing heat therefrom and cooperating with the water jacket of the engine for producing hot water.

12. The method of heating a liquid which comprises driving a fluid friction brake with a heat engine, circulating brake fluid in a closed recycling circuit through the brake to be heated by fluid friction therein, and circuatling the liquid to be heated in physically isolated heat exchange relation with the engine and the brake fluid.

References Cited in the file of this patent

UNITED STATES PATENTS

| | | |
|---|---|---|
| 998,876 | Daimler | July 25, 1911 |
| 1,436,078 | Bell | Nov. 21, 1922 |
| 1,781,437 | Chisholm | Nov. 11, 1930 |
| 2,215,296 | Ogden | Sept. 17, 1940 |
| 2,241,189 | Dick | May 6, 1941 |
| 2,399,941 | Resek | May 7, 1946 |
| 2,405,144 | Holthouse | Aug. 6, 1946 |
| 2,440,369 | Furman | Apr. 27, 1948 |
| 2,448,014 | Buckendale | Aug. 31, 1948 |
| 2,541,227 | Findley | Feb. 13, 1951 |
| 2,646,028 | Russell et al. | July 21, 1953 |